July 16, 1963  N. S. BERS  3,097,535
TRANSDUCING AND CONTROL SYSTEMS
Filed Jan. 25, 1960  8 Sheets-Sheet 1

INVENTOR:
Naum S. Bers
By Smyth & Roston
Albert Rosen
David P. Ogden
Attorneys

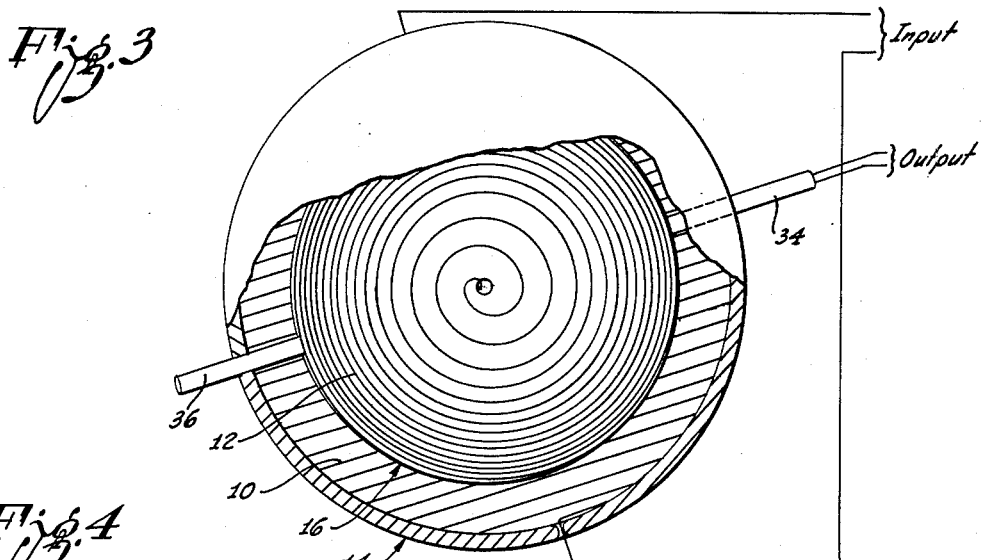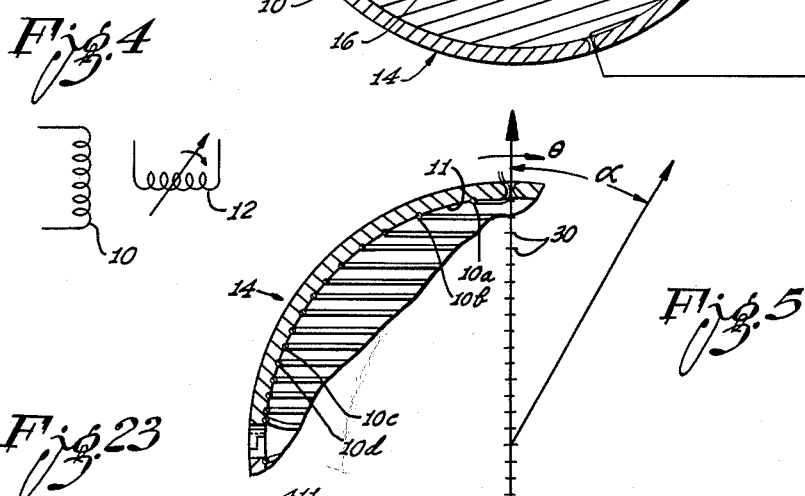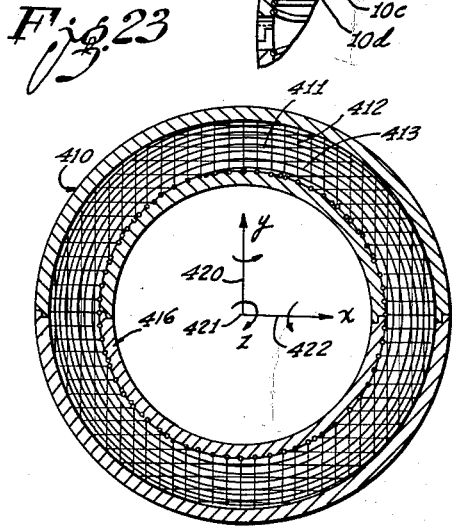

July 16, 1963 N. S. BERS 3,097,535
TRANSDUCING AND CONTROL SYSTEMS
Filed Jan. 25, 1960 8 Sheets-Sheet 3
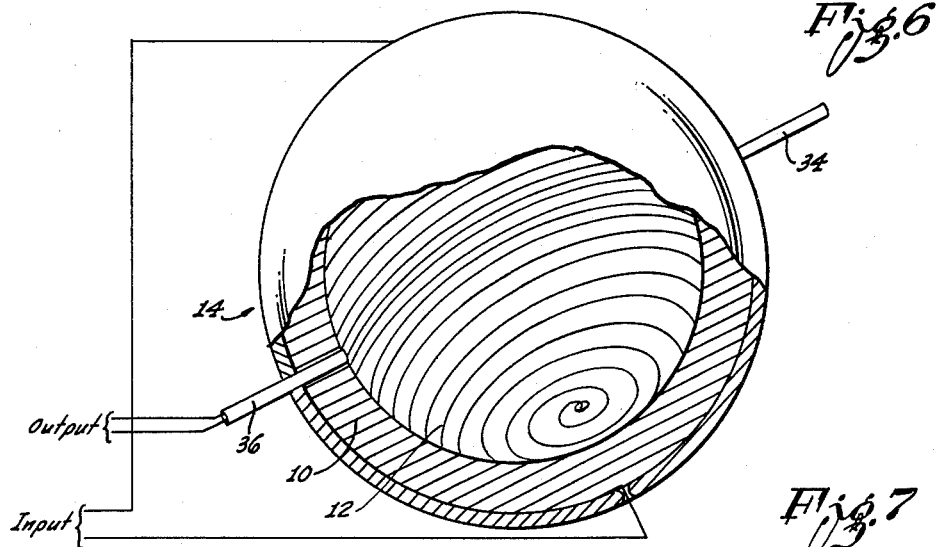
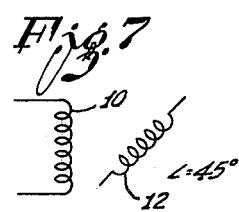
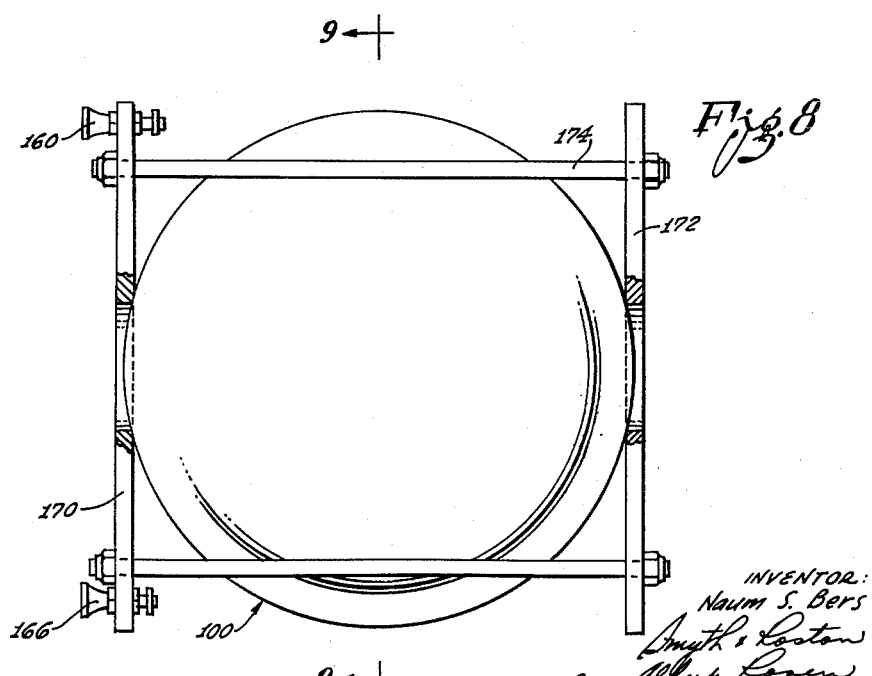
INVENTOR:
Naum S. Bers

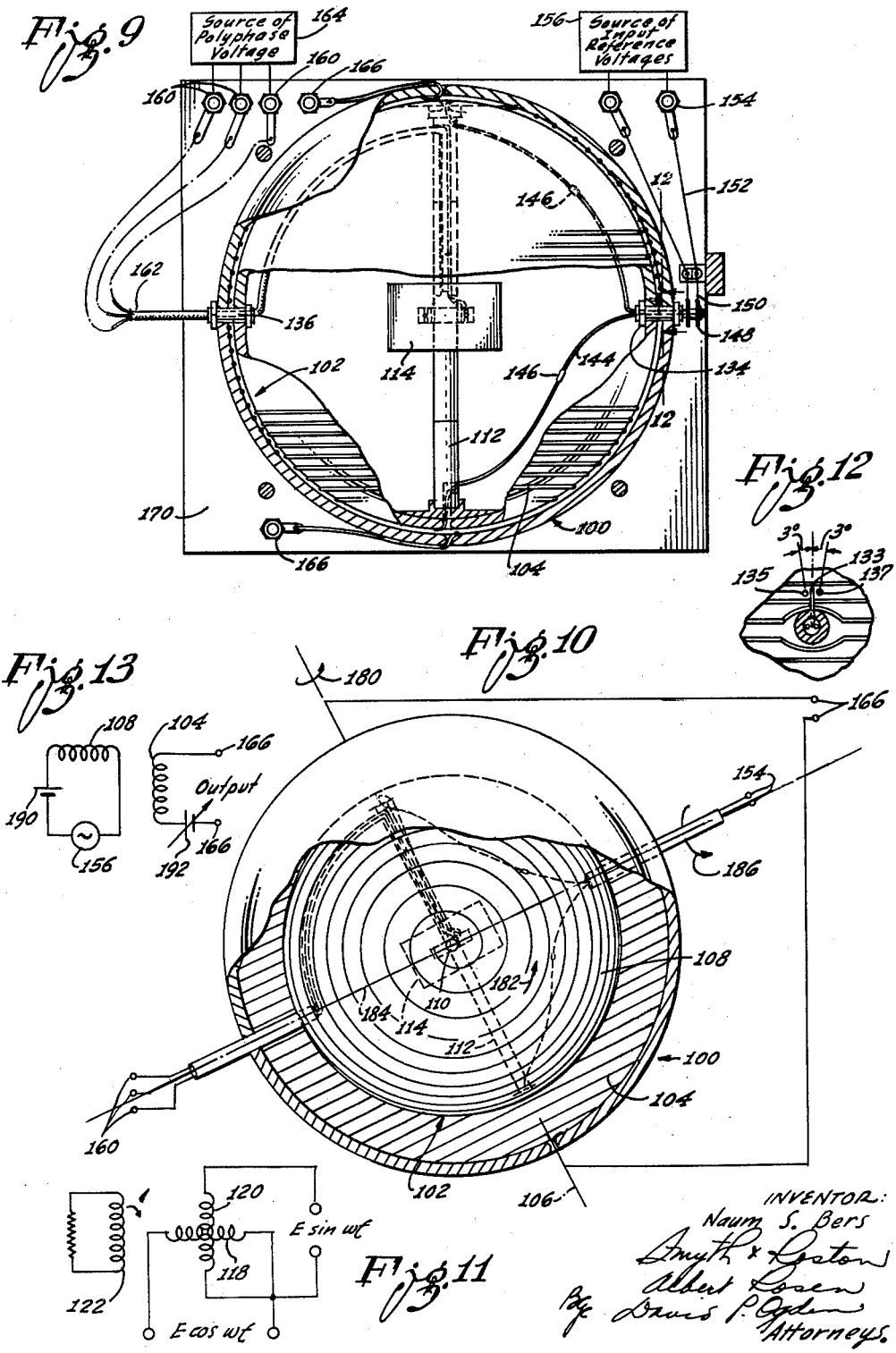

July 16, 1963

N. S. BERS 3,097,535

TRANSDUCING AND CONTROL SYSTEMS

Filed Jan. 25, 1960

INVENTOR:
Naum S. Bers

Smyth & Roston
Albert Rosen
By Davis P. Ogden
Attorneys.

July 16, 1963
N. S. BERS
3,097,535
TRANSDUCING AND CONTROL SYSTEMS
Filed Jan. 25, 1960
8 Sheets-Sheet 6
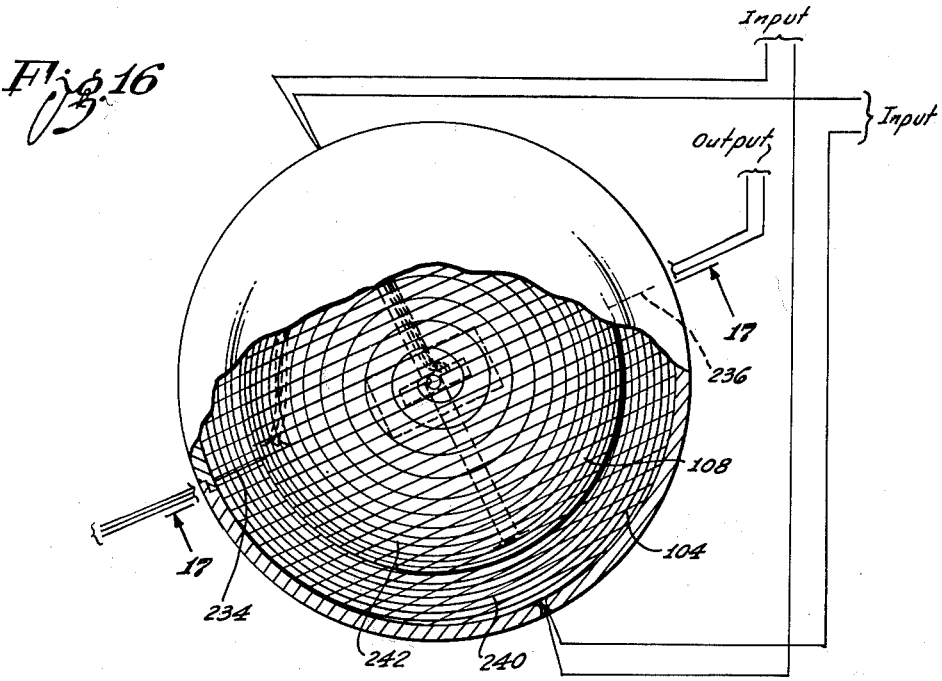
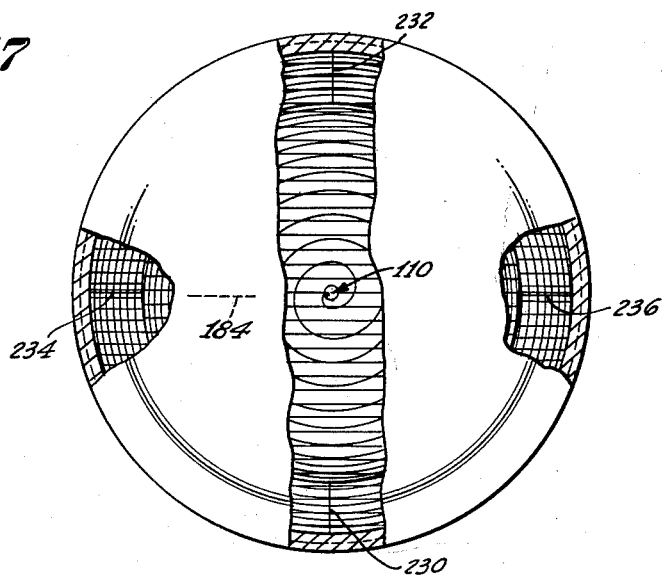
INVENTOR:
Naum S. Bers
Attorneys.

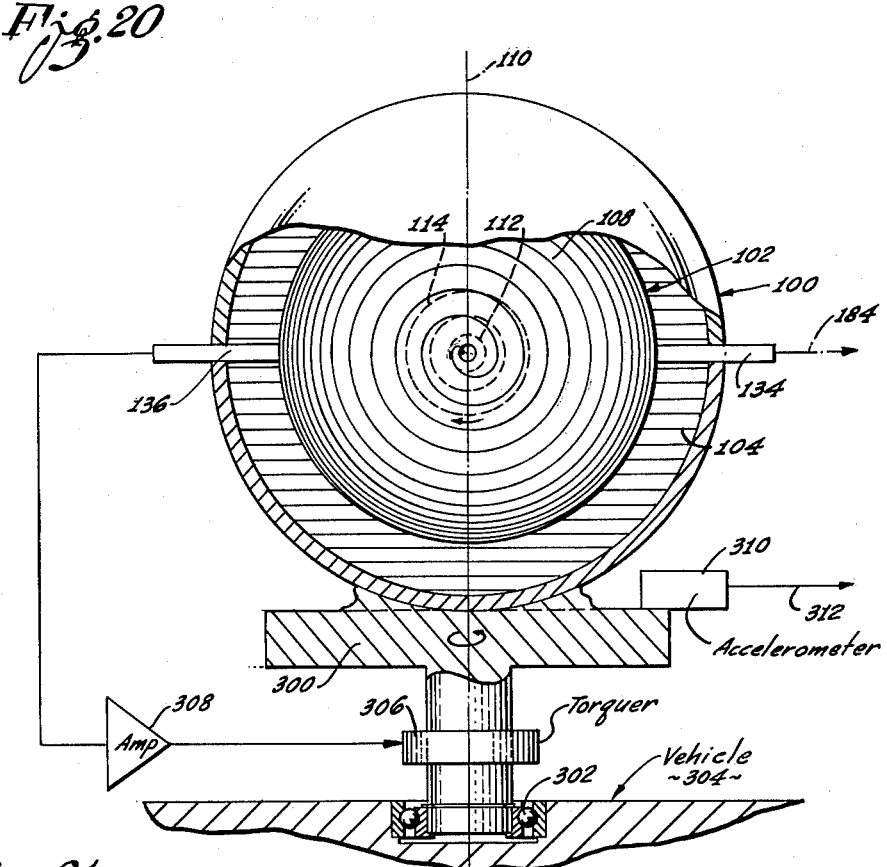
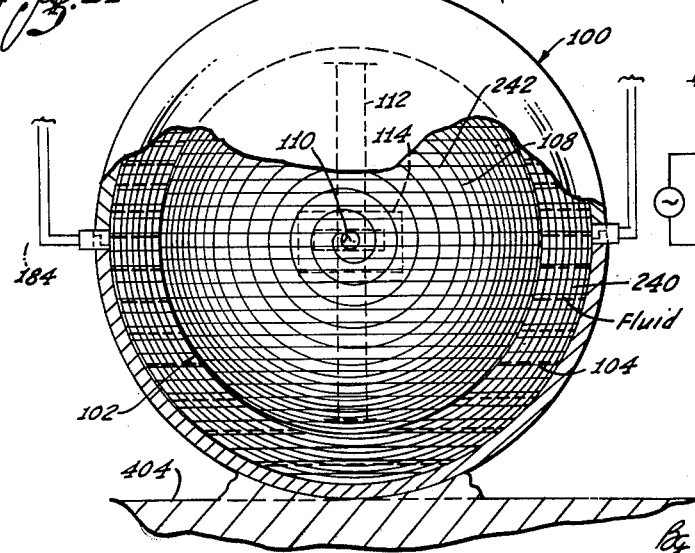
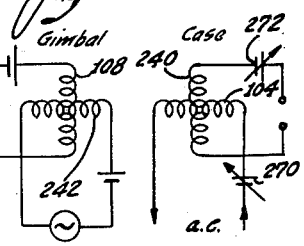

3,097,535
TRANSDUCING AND CONTROL SYSTEMS
Naum S. Bers, Los Angeles, Calif., assignor to Space Technology Laboratories, Inc., Los Angeles, Calif., a corporation of Delaware
Filed Jan. 25, 1960, Ser. No. 4,554
35 Claims. (Cl. 74—5.7)

This invention relates to transducing and control systems and will be discussed in connection with systems in which gyroscopic principles are involved. A system of the invention may be used, for example, in connection with a space platform to effect control over the angular disposition of the platform.

In copending application Serial No. 4,370, now Patent No. 3,052,859, filed by me on the same date as this application and assigned to the assignee of this invention, a function generator is disclosed and claimed for producing output signals representing more accurately than in previous generators a trigonometric function of the displacement of one member relative to another. The apparatus disclosed and claimed in copending application Serial No. 4,370, now Patent No. 3,052,859, produces such output signals by disposing each of first and second windings in a novel embodiment and by disposing the first and second windings in a novel relationship with respect to each other. The windings on the first and second members in the invention of the copending application are continuous spherical coils with pluralities of turns supported by concentric spherical members of high magnetic permeability. Each coil is provided with a uniform density of turns as projected along a particular diameter which corresponds to the axis of symmetry of the coil.

Because of the particular geometry of the windings and the spherical members used in the function generator disclosed and claimed in my copending application referred to above, sinusoidal current sheets are produced on each of the two magnetic surfaces facing the common air gap between the concentric windings. The magnetic field thus produced in the gap is substantially radial and with no discontinuities. By providing such a relationship, the mutual inductance between the first and second windings is proportional to a trigonometric function of the relative angle between the first and second spherical members.

Thus, if an alternating voltage is applied across the terminals of one of the windings, an alternating voltage will be induced across the terminals of the other winding in proportion to a trigonometric function of the relative angle between the first and second spherical members. Since no discontinuities are produced in the magnetic field between the first and second windings, enhanced accuracies are obtained by the apparatus disclosed and claimed in the copending application in comparison to the accuracies produced in prior generators.

The apparatus and systems constituting this invention have a special application to gyroscopes and to systems employing gyroscopes to stabilize a member in a particular angular disposition. The gyroscopes and gyroscopic systems disclosed and claimed in this application are particularly advantageous over the gyroscopes and gyroscopic systems of the prior art since several different functions can be performed by the spherical windings in the apparatus constituting this invention whereas separate components are required to perform each of the different functions in the gyroscopes of the prior art.

In the gyroscopes constituting this invention, first and second windings are respectively supported by the first and second spherical members in a manner similar to that disclosed and claimed in copending application Serial No. 4,370, now Patent No. 3,052,859. The first and second spherical members are disposed in concentric relationship with the inner spherical member constituting a precession gimbal and the outer spherical member constituting a case.

As will be more easily understood from the following specification, the gimbal and case windings operate in effect as a function generator to indicate the angular displacement of the gimbal with respect to the case. The signals induced in the case windings have an enhanced accuracy relative to those induced in the gyroscopic transducers of the prior art since there are no discontinuities produced in the field between the gimbal and case windings. Another advantage results from the fact that the gimbal and case windings can perform other functions in addition to serving as the gyroscopic output transducers. For example, a constant direct current can be introduced in series with the alternating current to the gimbal winding and a variable direct current can be introduced to the case winding. These currents cause a torque to be produced on the gimbal such that the torque is proportional to the variable direct current. This torque is instrumental for orientation and drift compensation purposes.

Certain of the embodiments of the gyroscope included in this invention also have advantages in addition to those disclosed above. These result from the inclusion of a third winding which is disposed within the case to obtain the induction of alternating signals in the gimbal winding. The signals induced in the gimbal winding may be converted to polyphase signals which are introduced to the gyro rotor to obtain the rotation of the gyro rotor on the second axis. In this way, the gyro rotor can be energized without any necessity for introducing signals to the rotor by wires from an external source. This is important in obtaining a simplification in the construction of the gyroscope, thus eliminating flex-lead reaction torques.

The apparatus discussed above represents a single degree-of-freedom gyroscope. The apparatus can be easily converted to a two degree-of-freedom gyroscope merely by providing an additional pair of windings, one on the gimbal and the other within the case, allowing the gimbal to float in the case and to be centered in it through a set of torsion wires. The physical relationship between this additional pair of windings corresponds to the physical relationship between the first winding on the gimbal and the first winding within the case. However, the second windings on the gimbal and within the case are respectively perpendicular to the first windings on the gimbal and within the case.

The apparatus constituting this invention can thus be adapted for such diverse uses as rate gyroscopes, rate integrating gyroscopes, and gyroscopic or non-gyroscopic accelerometers.

The apparatus constituting this invention can also be used in systems which maintain an element in a particular angular disposition in space. This in effect produces a system for stabilizing a platform in non-rotating inertial space. For example, the gyroscopes may be disposed on a platform in a moving vehicle which platform may be controlled through the outputs from the gyroscopes to maintain a fixed angular position in space regardless of the angular variations of the vehicle. By way of illustration, the platform may be controlled through only one single degree-of-freedom gyroscope so as to maintain a fixed angular position in space along a particular axis. By way of further illustration, the platform may be controlled through a two degree-of-freedom gyroscope to maintain fixed angularity in space around two substantially perpendicular axes. By way of further illustration, the platform may be controlled through three single degree-of-freedom gyroscopes or through one single degree-of-freedom gyroscope and one two degree-of-freedom gyroscope to maintain angularity around three axes or, in other words, to maintain a fixed platform attitude in non-rotating inertial space.

It will be appreciated from the following specification and drawings that both the two degree-of-freedom platform and the three degree-of-freedom platform may be considered as gimbal-less platforms because the stabilized element is free to rotate in a case, thus not requiring any gimbaling as is the common practice in platforms to date.

In the drawings:

FIGURE 3 is a schematic perspective view partially broken away to illustrate the relative dispositions of the gimbal winding and the case winding in an electromagnetic null position corresponding to a displacement of 90 degrees between the axes of the windings;

FIGURE 4 is a schematic diagram further illustrating the relative dispositions of the gimbal and case windings shown in FIGURE 3;

FIGURE 5 is a fragmentary sectional view schematically illustrating the relative spacing between adjacent turns of the case winding projected on an axis defined by the centers of the turns in the winding;

FIGURE 6 is a schematic perspective view similar to that shown in FIGURE 3 but with the gimbal winding being displaced from the position shown in FIGURE 3;

FIGURE 7 is a schematic diagram further illustrating the relative dispositions of the gimbal and case windings in FIGURE 6;

FIGURE 8 is an elevational view of apparatus constituting one embodiment of this invention and particularly illustrates various members for providing supports and accessibility;

FIGURE 9 is a sectional view taken along the line 9—9 of FIGURE 8 and illustrates in some detail the construction of the embodiment shown in FIGURE 8;

FIGURE 10 is a schematic perspective view of the case and gimbal, partially broken away, to illustrate the disposition of a gyro motor within the gimbal;

FIGURE 11 is a circuit diagram schematically illustrating the stator and rotor windings of the gyro motor shown in FIGURE 10 and the introduction of signals to the stator windings in the gyro motor;

FIGURE 12 is an enlarged fragmentary sectional view taken along the line 12—12 of FIGURE 9 and particularly illustrates stops for limiting the rotary movement of the gimbal relative to the case about the precession axis;

FIGURE 13 is a circuit diagram schematically illustrating how the gimbal and case windings are connected to obtain from the use of these windings both an output signal transducer and a torquer;

FIGURE 16 is a schematic perspective front view, partially broken away, of a two degree-of-freedom gyroscope which is constructed in a manner somewhat similar to the single degree of freedom gyroscope shown in FIGURES 8 to 12 inclusive;

FIGURE 17 is a schematic perspective view, partially broken away, of the two degree-of-freedom gyroscope as viewed from one end of the gyroscope shown in FIGURE 16;

FIGURE 20 is a schematic view, partially in section, of apparatus constituting a single degree-of-freedom gyroscope and also schematically illustrates electrical circuitry and special components connected to the gyroscope to obtain a single-axis space stabilized platform;

FIGURE 21 is a schematic view, partially in section, of a two degree-of-freedom gyroscope having a gimbal used as a two-axis space stabilized platform;

FIGURE 22 is a circuit diagram illustrating the connections of the different windings shown in FIGURE 21 to obtain operation as a space platform stabilized around two mutually perpendicular axes; and FIGURE 23 represents schematically a three-axis space stabilized platform.

Figure 1:
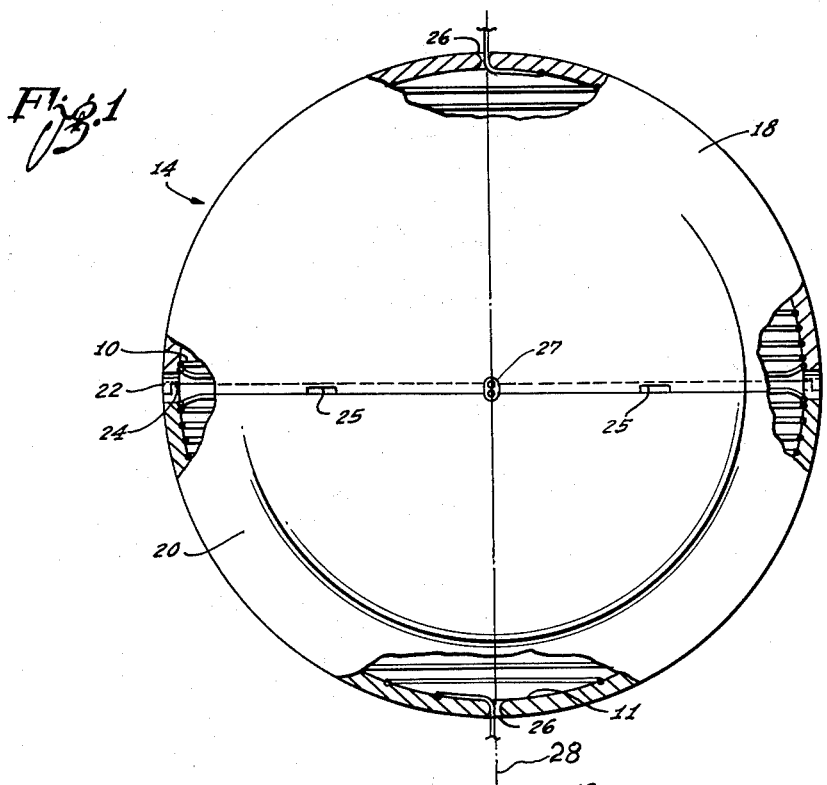
FIGURE 1 is an elevational view, partially broken away, of a spherical case and illustrates a winding supported against the inner wall of the case.
Figure 2:
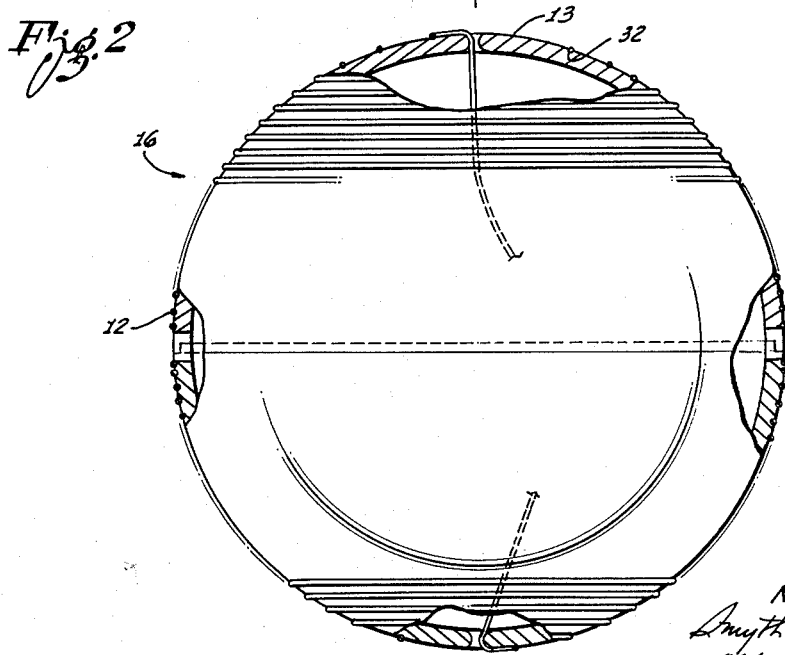
FIGURE 2 is an elevational view, partially broken away, of a spherical gimbal and a winding supported on the external surface of the gimbal.

In FIGURES 1 to 7, inclusive, a winding 10 and a winding 12 are respectively supported by hollow spherical members generally indicated at 14 and 16. The hollow spherical members 14 and 16 may be respectively designated as a case and a gimbal. For reasons which will be described in detail below, the members 14 and 16 are preferably made from a material having a high magnetic permeability. The case 14 is formed from a pair of hemispheres 18 and 20 (FIGURE 1), the hemisphere 18 being provided with a tongue 22 at its outer periphery and the hemisphere 20 being provided with a tongue 24 at its inner periphery to provide a press fit between the hemispheres. The hemisphere 18 is provided with slots 25 at its periphery so that a screwdriver can be inserted into the slots to pry apart the hemispheres if desired. A pair of diametrically disposed holes 26 having rounded edges is also provided in the case 14. The holes 26 are rounded so that electrical leads can be inserted through the holes without damage to electrical insulation thereon. The case 14 also is provided with an additional hole 27 for reasons which will be described in detail below.

The winding 10 is disposed against the inner surface 11 of the case 14. The turns on the winding 10 are spaced relative to one another to provide along the inner surface 11 a current density having a trigonometric relationship at progressive distances along the inner surface. These progressive distances occur from a pole defining one extremity of the winding 10 to a pole defining the other extremity of the winding 10 so that the summation of the arcuate distances between the turns defines an envelope extending between the upper and lower extremities of the winding 10 in FIGURE 1 as defined by the holes 26.

A current density having a trigonometric relationship with progressive distances along the inner surface 11 of the case 14 may be achieved by separating adjacent turns on the winding 10 so that the projections on an axis 28 of adjacent turns are equally spaced. The particular axis 28 of interest may be defined as extending through the centers of the successive turns of the winding 10 and may be best seen in FIGURE 5. The equal spacing between the projections of adjacent pair of turns on the axis 28 is illustrated at 30 in FIGURE 5. The spacing between adjacent turns in the winding 10 may be in the order of 0.005 inch along the axis 28 when the winding 10 is formed from No. 30 heavy Formvar insulated magnet wire and when the case 14 has a diameter of approximately 5 inches.

When the projections of adjacent turns on the axis 28 are equally spaced, a varying arcuate spacing is produced on the inner surface 11 of the case 14 with respect to the arcuate distances between adjacent turns. For example, a pair of turns 10a and 10b (FIGURE 5) near a pole of the case 14 is separated by a greater arcuate distance than a pair of turns 10c and 10d near the equator of the case. This arcuate distance is measured along the envelope defined by the turns in the winding 10.

into proper position within the gimbal 102. A gyro motor 114 is mounted on the middle portion of the shaft 112 and is disposed on bearings for rotation relative to the shaft. The gyro motor is provided with a stator and a rotor and with a pair of windings 118 and 120 (FIGURE 11) on the stator and a single winding 122 on the rotor.

The gimbal 102 is supported on a pair of coaxial shafts 134 and 136 (FIGURES 9 and 10) for rotation with the shafts relative to the case 100. The shaft 134 extends radially from the gimbal 102 through the case 100 at one end of the gimbal and the case, and the shaft 136 extends radially from the gimbal 102 through the case 100 at the end diametrically opposite to the shaft 134. The shafts 134 and 136 may be made from a suitable non-magnetic material such as a plastic designated by the trademark "Lucite." The shaft 134 is provided with a lug 133 (FIGURE 12) which engages stops 135 and 137 after a rotation of the shafts 134 and 136 through relatively small angles such as ±3 from a zero position. The stops 135 and 137 may extend from the case 100.

The gimbal 102 is attached to shafts 134 and 136 which are rotatably supported by the case 100 as for example by ballbearings (not illustrated) located in the case. The shaft 134 is internally bored in a radial direction so that leads 144 can be inserted through this bore and soldered to the free ends of the winding 108 as at 146. The leads 144 are in turn electrically coupled to a pair of slip rings 148. Brushes 150 ride on the slip rings 148 and leads 152 extend from the brushes 150 to a pair of input terminals 154. The input terminals 154 are connected to a source 156 of input voltage. The signals from the source 156 preferably have alternating characteristics of sinusoidal wave shape. For example, an alternating voltage having a root mean square value of approximately six volts and having a frequency of approximately sixty cycles per second may be applied to the winding 108 from the source 156.

The shaft 136 is also internally bored in a radial direction so that leads 162 can be inserted through this bore. The leads 162 extend along the internal periphery of the gimbal 102 and into the gimbal at a position corresponding to the shaft 112. One of the leads 162 is connected to a first terminal of stator winding 118 in FIGURE 11, and a second one of the leads 162 is connected to a first terminal of the stator winding 120. The third lead is connected to the second terminals of the stator windings 118 and 120. The leads 162 are connected to terminals 160, which are in turn connected to a source 164 of polyphase alternating voltage. The rotor winding 122 is short circuited or is connected to a resistance having a relatively low value as may be seen in FIGURE 11. Although the gyro motor 114 includes only two stator windings in FIGURE 11, it will be appreciated that a plurality of stator windings may be used and that polyphase signals may be introduced to the windings.

The terminals 154 and 160 and a pair of output terminals 166 are disposed on a side plate 170 (FIGURE 8) which may be made from a suitable material having properties of electrical insulation such as that designated by the trademark "Micarta." The plate 170 and a plate 172 made from the same material as the plate 170 are disposed on opposite sides of the spherical member 100 and are maintained in spaced relationship as by studs 174.

The gyro motor 114 is energized through the leads 162 from the source 164 so as to rotate at a constant speed on the shaft 112.

The precessional movement of the gimbal 102 on the axis 184 causes the winding 108 to become displaced relative to the winding 104 such that a signal is now induced in the winding 104. This signal has an amplitude which provides an indication as to the angle of precession of the gimbal with respect to the case.

The advantages of including the windings 104 and 108 are considerably enhanced because these windings can also be used as a torquer in addition to their use as a signal transducer. The windings can be used as a torquer by applying to the windings signals having different characteristics than those applied from the source 156 to the gimbal winding 108. For example, as shown in FIGURE 13, a direct current of constant magnitude may be applied to the gimbal winding 108 from a suitable source 190 such as a battery. The source 190 of direct current may be in a series relationship with the alternating current in winding 108 of the source 156. A direct current having a variable magnitude may also be applied to the winding 104 from a source indicated schematically at 192.

Such an arrangement causes the windings to operate in effect as a motor. The torque produced by the motor is dependent upon the magnitudes of the direct currents involved. Since the voltage and consequently the current from the source 190 is constant, the torque can be controlled by varying the voltage from the source 192. This may be seen from the following relationship:

$$T = KI_1 I_2$$

where $T$ = the torque imposed on the gimbal 102;
$K$ = a constant;
$I_1$ = the current flowing in the winding 108 in accordance with the introduction of a direct voltage to the winding from the source 190; and
$I_2$ = the current flowing in the winding 104 in accordance with the introduction of a direct voltage to the winding from the source 192.

The above has described a means of torquing the gimbal without a standard device such as a torquer.

Figure 14:
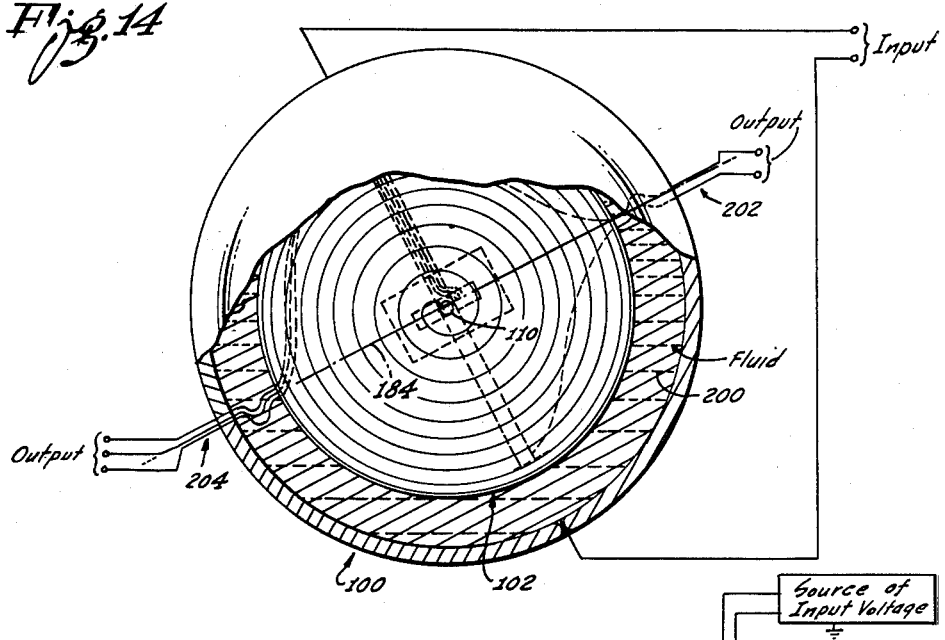
FIGURE 14 is a schematic perspective view, partially broken away, of an embodiment of a gyroscope constructed to eliminate shafts and to provide unbilical cords for the introduction of signals to various members in the gyroscope while the gimbal is floated.

In the embodiment shown in FIGURES 8 to 12, inclusive, shafts 134 and 136 are included to obtain a controlled rotation of the gimbal 102 relative to the case 100 on the precession axis 184. No such shafts, however, are included in the embodiment shown in FIGURE 14. The gimbal 102 is maintained in concentric relationship with respect to the case 100 by disposing a buoyant fluid 200 such as a liquid within the case 100 and by supporting the gimbal on this buoyant fluid. Since no shafts are included in the embodiment shown in FIGURE 14, electrical energy is introduced through umbilical cords, generally indicated at 202 and 204, to the gimbal winding 108 and to the stator windings 118 and 120 (FIGURE 11) in the gyro motor 114. As shown in FIGURE 14, the umbilical cords 202 and 204 are disposed in a looped configuration to allow for some stretching of the cords in accordance with any rotation of the gimbal 102 relative to the case 100.

The embodiment shown in FIGURE 14 has all of the advantages of the embodiment shown in FIGURES 8 to 12, inclusive, and also has certain additional advantages. One of these additional advantages results from the simplification in the construction of the gyroscope because of the elimination of the shafts 134 and 136. Another advantage results from the fact that this causes the gyroscope shown in FIGURE 14 to have two degrees of freedom. The two degrees of freedom gyroscope will be discussed in some detail subsequently. However, as will be seen from the subsequent discussion, an additional winding is required on the gimbal 102 and an additional winding is required within the case 100 in order to convert the embodiment shown in FIGURE 14 into a two degree-of-freedom gyroscope.

Figure 15:
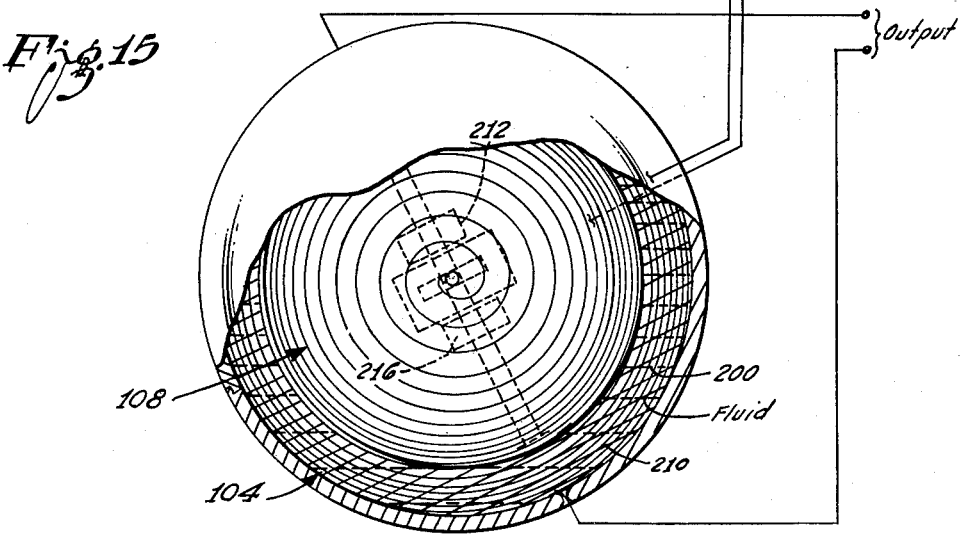
FIGURE 15 is a schematic perspective view, partially broken away, of another embodiment of the gyroscope including an additional winding within the case and further including electrical circuitry connected to the gimbal winding to eliminate input electrical leads to the various members in the gyroscope.

The embodiment shown in FIGURE 15 eliminates the cords 202 and 204. The embodiment shown in FIGURE 15 provides such simplifications in construction by including a third winding 210 which is supported within the case 100 in a manner similar to that discussed above for the winding 10 in FIGURES 1 to 7, inclusive. The winding 210 is provided with a plurality of turns which are disposed in a spaced relationship corresponding to that described above for the winding 10 in FIGURES 1 to 7, The winding 10 may be supported on the interior periphery of the case 14 by first forming the two separate halves of the winding on the exterior peripheries of a pair of hemispheres which may be made from a material having a relatively low melting point.

For example, each hemisphere may be made from a metallic alloy designated as "Cerrobend" and having a melting point of approximately 130° F. An adhesive is then applied selectively to each winding and to the inner surfaces of the hemispheres 18 and 20, which are still separated at this time. Each hemisphere of the alloy having the low melting point may then be pressed against the inner surface of one of the hollow hemispheres 18 and 20 until the adhesive dries. The alloy having the low melting point is then heated so as to fuse the windings 10 to the hemisphere 18 while the melting alloy is discarded. The free ends of the windings at the equators of the hemispheres 18 and 20 are connected together at the hole 27 as by soldering to form the completed winding 10. The ends of the winding 10 at the poles are extended through the holes 26 and the hemispheres 18 and 20 are pressed together to form the case 14.

The gimbal 16 may be formed in a manner similar to the case 14 and is provided with a diameter slightly less than that of the case 14. For example, the spacing between the windings 10 and 12 may be in the order of 0.012 inch when the case 14 and the gimbal 16 have diameters in the order of 5 inches. However, since the winding 12 is supported on the external peripheral surface 13 of the gimbal 16, the winding may be formed on the gimbal after the two halves of the gimbal have been pressed together. The successive turns of the winding 12 may be disposed in shallow grooves 32 formed on the peripheral surface 13 of the gimbal 16.

The winding 12 is also provided with a plurality of turns which are spaced in a manner similar to the spacing of the turns on the winding 10. This causes the spacing between adjacent turns on the winding 12 to be equidistant when such spacings are measured along the axis extending through the centers of the successive turns in the winding.

In the positioning of the windings 10 and 12 in FIGURES 3 and 4, the axis defining the centers of the successive turns in the winding 10 is perpendicular to the corresponding axis defining the centers of the successive turns in the winding 12. For the present discussion this is considered to correspond to a zero positioning of the windings 10 and 12.

It will be appreciated that in connection with the present invention the gap between the outer surface 13 and the inner surface 11 is small and that the gimbal and case are of highly permeable material. In a highly permeable material, the magnetic field is zero. For example, the magnetic field within the gimbal 16 is zero. At the surface of a highly permeable material, the tangential magnetic field must vanish. Hence it is reasonable that for a short gap the predominant field is radial.

In the positions of the windings 10 and 12 shown in FIGURE 3, no magnetic coupling is produced between the windings. In other words, none of the magnetic flux produced by the winding 10 influences the winding 12 since the windings 10 and 12 are in perpendicular relationship to each other. This may be seen from the schematic showing in FIGURE 4 as to the relative dispositions of the windings 10 and 12.

When the winding 12 is rotated with shafts 34 and 36 relative to the winding 10 to the position shown in FIGURE 6, the windings 10 and 12 have a relative disposition such as schematically shown in FIGURE 7. This causes some of the flux produced by the winding 10 to link the turns of the winding 12. Continued rotation of the winding 12 with the shafts 34 and 36 causes increased amounts of the flux produced by the winding 10 to link the turns of the winding 12 until the winding 12 has rotated through an angle of 90°. Thereafter the amount of flux linking the winding 12 from the winding 10 decreases with continued angular displacements of the winding 12 through the next 90°.

The amount of flux linking the winding 12 in the position shown in FIGURES 6 and 7 is trigonometrically related to the amount of flux linking the winding 12 in the position shown in FIGURES 3 and 4, this trigonometric relationship being dependent upon the angle α shown in FIGURE 5. In this way, a signal is induced in the winding 12 wherein the amplitude of the signal is related in a trigonometric pattern to the angular displacement between the windings 10 and 12 from a reference position. If the relative positions of the windings 10 and 12 as shown in FIGURES 3 and 4 should be considered as a zero position, the trigonometric pattern of the signals induced in the winding 12 would be a sine pattern.

The apparatus described above has certain important advantages. Because of the particular configuration of the winding 10, a magnetic field is produced with no discontinuities in the space around the winding 10. Since no discontinuities are produced in the magnetic field, the winding 12 can be rotated with the shafts 34 and 36 to any desired position without affecting the accuracy of the signals induced in the winding 12. Furthermore, since the winding 12 is provided with a configuration corresponding to that of the winding 10, no discontinuities are produced in the output signals as a result of the reaction of the winding 12 to the magnetic flux linking the turns of the winding 12. This prevents errors from being produced in the apparatus constituting this invention such as are produced in the function generators now in use because of the occurrence of discontinuities in the magnetic fields in such function generators.

By forming the case 14 and the gimbal 16 from a non-magnetic material or a magnetic material of low magnetic permeability, the intensity of the magnetic field produced in the gap between the windings becomes considerably reduced.

It should be appreciated that each of the windings 10 and 12 may be formed from a plurality of coils in parallel. By forming each of the windings 10 and 12 in this manner, the flow of current through the windings 10 and 12 can be correspondingly increased. This produces a corresponding increase in the strength of the field in the gap between the windings 10 and 12 such that an output signal of increased amplitude is induced in the winding 12. When each of the windings 10 and 12 is formed from a plurality of coils in parallel, the depth of the grooves for holding the individual turns of the coils may have to be increased.

FIGURES 8 to 12, inclusive, illustrate a gyroscope constituting one embodiment of the invention. The gyroscope includes first and second spherical members 100 and 102 respectively corresponding to the spherical members 14 and 16 in the previous figures. The spherical members 100 and 102 may be respectively designated as the case and the gimbal of the gyroscope.

A winding 104 is supported within the case 100 and is provided with a plurality of turns which are spaced in a manner similar to that described above for the turns in the winding 10 shown in the previous figures. The winding 104 is disposed along a first particular axis indicated at 106 in FIGURE 10. A winding 108 is disposed on the gimbal 102 and is provided with a plurality of turns having a spacing corresponding to that described above for the winding 12 in the previous figures. The winding 108 is disposed along an axis 110 which extends into the plane of the paper at the center of the gimbal 102.

A shaft 112 is rigidly supported within the gimbal 102 along the axis 106. The shaft 112 may be rigidly supported within the gimbal 102 by welding the shaft to the gimbal or by screwing the shaft into threaded sockets in the gimbal. The shaft 112 may be formed from several portions each of which is threaded into the adjacent portion of the shaft to facilitate the insertion of the shaft inclusive. The winding 210 is disposed in perpendicular relationship to the case winding 104 and in parallel relationship to the gimbal winding 108 in the null position of the gyroscope.

Signals from the source 156 in FIGURE 9 are introduced to the winding 210 in the embodiment shown in FIGURE 15 rather than to the winding 108. Since the gimbal winding 108 is substantially parallel to the winding 210, signals are induced in the gimbal winding 108, and these signals are provided with characteristics corresponding to the characteristics of the signals introduced to the winding 210. The signals induced in the gimbal winding 108 cause the gimbal winding to produce an electromagnetic field corresponding to that produced by the winding in the embodiment shown in FIGURES 8 to 12, inclusive.

The signals induced in the winding 108 are also introduced to a converter 212 which is disposed within the gimbal 102. The converter 212 may be constructed in a conventional manner to convert alternating signals having a single phase into polyphase alternating signals. The polyphase alternating signals are introduced to the stator windings 118 and 120 in FIGURE 11 to obtain an operation of the gyro motor 114.

When the windings 104 and 108 are also to be used as a torquer, the signals induced in the winding 108 are introduced to a rectifier 216. The rectifier 216 may be constructed in a conventional manner to change the alternating signals in the winding 108 into a direct voltage corresponding to that provided by the source 190 in FIGURE 13. The direct voltage produced by the rectifier 216 is introduced to the winding 108 in a series relationship with the alternating voltage induced in the winding. A direct voltage having a variable magnitude is introduced to the case winding 104 in a manner similar to that described previously in connection with the torquer shown in FIGURE 13.

It will be seen from the discussion in the previous paragraphs that the embodiment shown in FIGURE 15 is able to operate efficiently as a gyroscope without the introduction from an external position of any electrical leads into the gyroscope other than the introduction of leads to the internal surface of the case 100. This results from the fact that all of the electrical power required to operate the gyroscope is obtained from the introduction of electrical signals to the winding 210 from the source 156. Furthermore, the output signals from the gyroscope are obtained from the winding 104 which is also disposed against the internal surface of the case. This constitutes a distinct advantage over the gyroscopes of the prior art since such gyroscopes have required the introduction of at least several leads to the internal members in the gyrscope. The advantages of the embodiment shown in FIGURE 15 are further enhanced because the embodiment can also operate as a torquer without any requirement for the introduction of electrical leads internally into the embodiment from a position external to the embodiment.

The gyroscopes described above can be used either as rate gyroscopes or as rate integrating gyroscopes. The gyroscopes described above actually constitute rate gyroscopes in which the signals induced in the winding 104 indicate the rate at which the gimbal 102 is rotated on the input axis 110. However, the gyroscopes described in the previous embodiments can be easily converted into rate integrating gyroscopes by disposing a damping fluid in the gap between the gimbal 102 and the case 100. Such a damping fluid would occupy the space provided for the fluid 200 in FIGURES 14 and 15 and would actually correspond to the fluid 200 if the fluid 200 should have the proper characteristics. In a rate integrating gyroscope, the output signals induced in the winding 104 indicate the angle through which the gimbal 102 has moved on the axis 110.

Torsion wires may be substituted for the shafts 134 and 136 in the single degree-of-freedom gyroscope shown in FIGURES 8 to 12, inclusive. Torsion wires are also used in the two degree-of-freedom gyroscope shown in FIGURES 16 and 17. First and second wires 230 and 232 extend between the gimbal 102 and the case 100 at diametrically opposite ends of these members. The torsion wires 230 and 232 are disposed perpendicular to the axis 110 also shown in FIGURES 8 to 12, inclusive. Torsion wires 234 and 236 are also disposed between the gimbal 102 and the case 100 at diametrically opposite ends of these members. The torsion wires 234 and 236 are disposed in substantially perpendicular relationship to the wires 230 and 232 and are disposed on the axis 184 to replace the shafts 134 and 136.

The embodiment shown in FIGURES 16 and 17 includes the case winding 104 and the gimbal winding 108 shown in FIGURES 8 to 12, inclusive. The embodiment shown in FIGURES 16 and 17 also includes a second case winding 240 and a second gimbal winding 242. Each of the windings 240 and 242 is provided with a plurality of turns which are spaced relative to one another in a manner similar to that described above for the windings 10 and 12 in FIGURES 1 to 7, inclusive. The windings 240 and 242 are respectively disposed within the case 100 and the gimbal 102 in a manner similar to that described above to the windings 104 and 108. The winding 240 is perpendicular to the winding 104 and is parallel to the winding 108 in the null position of the gyroscope shown in FIGURES 16 and 17. In like manner, the winding 242 is perpendicular to the winding 108 and is parallel to the winding 104 in the null position of the gyroscope shown in FIGURES 16 and 17.

The torsion wires 230 and 232 may be used to introduce electrical signals to the input terminals of the gimbal winding 108 from the source 156. The torsion wires 230 and 232 may be used in this manner by insulating the wires properly from the gimbal 102 and the case 100. In like manner, the torsion wires 234 and 236 may be used to introduce signals to the gimbal winding 242. The signals introduced to the gimbal winding 242 may be 90° out of phase from the signals introduced to the winding 108. In addition to the input leads to the windings 108 and 210, leads also are extended into the gyroscope shown in FIGURES 16 and 17 to provide the input connections to the stator windings shown in FIGURE 11 and forming a part of the motor 114.

Because of the torsional supports provided for the gimbal on two substantially perpendicular axes, the gimbal is able to precess around both of these axes.

Figure 18:
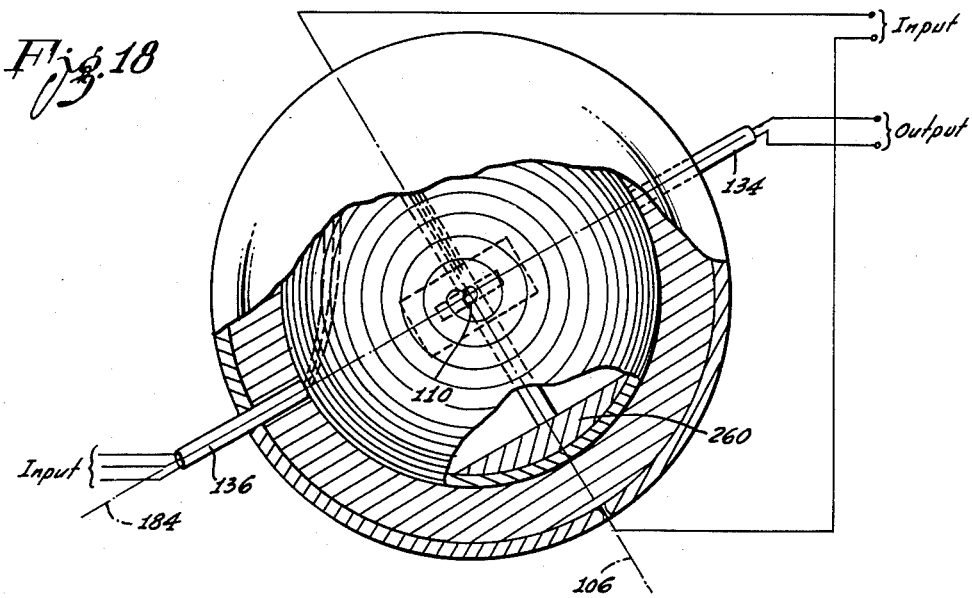
FIGURE 18 is a schematic perspective view, partially broken away, of a linear accelerometer utilizing principles of the present invention.

The embodiment shown in FIGURE 18 is similar to the embodiment shown in FIGURES 8 to 12, inclusive, except that the gimbal 102 is unbalanced by weighting one end of the gimbal as at 260 to make the gimbal pendulous. The weight 260 is symmetrical about a vertical line extending in FIGURE 18 through an axis and corresponding to the axis 106 in FIGURE 10. The gimbal is unbalanced so as to be heavier at the bottom in FIGURE 18 than at the top in that figure.

Because of the unbalance provided for the gimbal 102, linear acceleration imparted to the gyroscope along the input axis 110 causes the gimbal to rotate on the axis 184 corresponding to the shafts 134 and 136. The rate of angular movement of the gimbal 102 on the shafts 134 and 136 is directly related to the linear acceleration of the gimbal along the axis 110.

Figure 19:
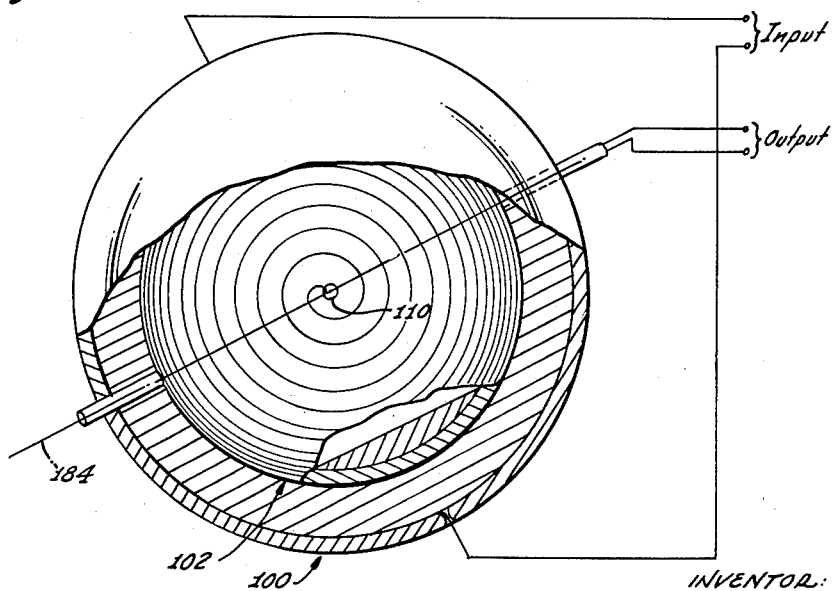
FIGURE 19 is a schematic perspective view, partially broken away, of a similar linear accelerometer but does not include the gyro motor shown in FIGURE 18.

The embodiment shown in FIGURE 19 corresponds to the embodiment shown in FIGURE 18 except that the gyro motor 114 and the shaft 112 are eliminated in the embodiment shown in FIGURE 19. Under such circumstances, a linear acceleration of the embodiment shown in FIGURE 19 along the axis 110 also causes the gimbal 102 to rotate on the axis 184 corresponding to the shafts 134 and 136. However, the linear acceleration of the embodiment shown in FIGURE 19 along the axis 110 is now indicated by the angle through which the gimbal 102 rotates on the axis 184.

It should be appreciated that the various embodiments shown in FIGURES 16 to 19, inclusive, can be changed to conform with the embodiment shown in FIGURES 8 to 12, inclusive, the embodiment shown in FIGURE 14 and the embodiment shown in FIGURE 15. For example, by including the fluid 200 and torsion wires the shafts 134 and 136 in the accelerometer shown in FIGURE 18 can be eliminated so as to obtain embodiments similar to those shown in FIGURES 14 and 15. The accelerometer shown in FIGURE 18 can be made similar to the embodiment shown in FIGURE 14 by including the umbilical cords 202 and 204 of FIGURE 14. The accelerometer shown in FIGURE 18 can be also adapted for construction in a manner similar to that shown in FIGURE 15 by including the winding 210, the converter 212 and the rectifier 216 shown in FIGURE 15. Similar modifications can be made to the accelerometer shown in FIGURE 19.

FIGURE 20 illustrates a system which includes a gyroscope similar to that shown in the previous figures and which includes additional members and electrical circuitry to obtain the operation of a single axis platform. The gyroscope shown in FIGURE 20 may be constructed in a manner similar to that shown in FIGURES 8 to 12, inclusive, and described in detail above. For example, the the gyroscope includes the case 100, the gimbal 102, the winding 104 within the case, the winding 108 on the gimbal, and the gyro rotor 114 rotatable on the shaft 112 within the gimbal. The gyroscope shown in FIGURE 20 also includes the shafts 134 and 136 for obtaining a precession of the gimbal 102 relative to the case 100 on the axis 184.

The case 100 is attached as by clamping to a platform 300 which is rotatable on bearings 302 relative to a control member 304 such as an airplane. The platform 300 is rotatable relative to the control member 304 on the input axis 110 in FIGURES 8 to 12, inclusive. A torquer generally indicated at 306 is disposed on a neck portion of the platform 300. The torquer 306 may be formed from a pair of windings, one of which is disposed on the neck portion of the platform 300 for rotary movement relative to the second winding. The second winding of the torquer 306 is connected to the output terminals of an amplifier 308 through standard electronics to the output of the gyroscope.

When the gimbal 102 precesses in response to a disturbance torque around the sensitive axis of the platform, the platform torquer will generate an opposing torque and thus maintain the angular position of the platform about its sensitive axis fixed in space.

Maintaining the platform 300 in a particular angular disposition in space on the axis 110 may be important in obtaining proper measurements from a transducer such as an accelerometer 310. This accelerometer may be disposed on the platform 300 so as to measure linear accelerations in a direction which may be indicated by an arrow 312 and which is perpendicular to the axis 110, or at some desirable angle to it.

The apparatus shown in FIGURES 21 and 22 is constructed to maintain the gimbal in a gyroscope in a fixed angular disposition in space on two mutually perpendicular axes. The apparatus shown in FIGURES 21 and 22 includes the case 100 and the gimbal 102 and further includes a control member 404 such as an aircraft which is mechanically coupled to the case as by clamping or cold soldering. The first and second windings 104 and 240 are supported within the case in perpendicular relationship to each other in a manner similar to that shown in FIGURE 16 and described above. In like manner, the first and second windings 108 and 242 are supported on the gimbal 102 in a mutually perpendicular relationship and in a manner similar to that shown in FIGURE 16 and described above. The windings 104 and 240 within the case 100 are respectively parallel to the windings 242 and 108 on the gimbal 102 in the null position of the gyroscope. The gyro motor 114 is disposed on the shaft 112 within the gimbal 102 in a manner similar to that shown in the previous embodiments.

Any angular movements of the vehicle except the one around the motor spin axis produce precessional movements of the gimbal about the axes 184 and 110. This causes signals to be induced in the windings 104 and 240. These signals are rectified and introduced as direct currents to the windings 104 and 240 as illustrated at 270 in FIGURE 22. The magnitudes of these direct currents introduced to the windings 104 and 240 in conjunction with respective fixed currents in the gimbal windings (108 and 242) will generate proper torques for maintaining the gimbal angularly fixed around the two axes discussed above.

As described above, the apparatus shown in FIGURE 19 operates as a space platform to maintain the case 100 in a particular disposition in space on a single axis. Three of such embodiments may be disposed in perpendicular relationship to one another on a gimbal to obtain a space platform which is angularly fixed in space around three mutually perpendicular axes. As an alternative, such a gimbal or three-axis platform may be stabilized through one single degree-of-freedom gyroscope and one two degree-of-freedom gyroscope.

FIGURE 23 is a schematic diagram which illustrates the principle of a three-axis platform based on concepts which emanate from this invention. Within a case 410 are secured three mutually perpendicular spherical windings 411, 412, and 413. On a gimbal 416 are secured three windings of the type described above. The axes 420, 421, and 422 are equivalent to three mutually perpendicular axes of three single degree-of-freedom gyroscopes with the result of being able to keep the platform fixed in inertial space.

What is claimed is:

1. In combination: a first winding having a spherical configuration and provided with a plurality of turns disposed along a first particular axis, means coupled to the first winding for energizing the winding to produce a magnetic field having a trigonometric pattern of intensity at progressive positions external to the winding and along a meridian of the spherical configuration, means coupled to the first winding for producing a rotation of the winding on a second particular axis transverse to the first particular axis, gyro means disposed within the first winding for rotation on a third particular axis having a vectorial component corresponding to the first particular axis, means coupled to the gyro means for producing a rotation of the gyro means on the third particular axis, and a second winding having a spherical configuration and provided with a plurality of turns disposed along a fourth particular axis having a vectorial component corresponding to the second particular axis, the second winding being disposed within the magnetic field provided by the first winding to produce signals in accordance with the precession of the first winding on a fifth particular axis transverse to the first and second particular axes.

2. In combination, a first plurality of generators connected to one another in a first circuit and disposed relative to one another to define the periphery of a first sphere and having a spacing relative to one another along the periphery of the first sphere to provide an equal spacing between adjacent pairs of generators in the plurality upon the projection of the generators on a particular axis of the first sphere, a second plurality of generators connected to one another in a second circuit and disposed relative to one another to define the periphery of a second sphere concentric with the first sphere and having a spacing relative to one another along the periphery of the second sphere to provide an equal spacing between adjacent pairs of generators in the second plurality upon the projection of the generators in the second plurality on a particular axis of the second sphere, the generators in the first plurality being disposed relative to the generators in the second plurality to produce signals in accordance with the relative rotary displacements between the generators in the first plurality and the generators in the second plurality on a first particular axis, means for obtaining a rotation of the generators in the first plurality relative to the generators in the second plurality on a second particular axis transverse to the particular axis and having a component corresponding to the particular axis of the second sphere, a gyro rotor rotatable on a third particular axis transverse to the first and second particular axes and having a component corresponding to the particular axis of the first sphere, the gyro rotor being coupled to the generators in the first plurality to obtain a rotation of the gyro rotor on the second particular axis relative to the generators in the second plurality, and means for obtaining a rotation of the gyro rotor on the third particular axis.

3. In combination, a first plurality of generators disposed relative to one another to produce a continuous field in the space around the generators and to provide for the continuous field a density having a particular relationship at progressive positions along an envelope defined by the successive generators in the plurality, means coupled to the generators in the plurality for producing a rotation of the generators on a first particular axis, a gyro rotor rotatable on a second particular axis transverse to the first particular axis, the gyro rotor being coupled to the generators in the first plurality for rotation with the generators in the first plurality on the first particular axis, motive means electrically coupled to the gyro rotor for producing a rotation of the gyro rotor on the second particular axis, the generators in the first plurality being disposed for precessional rotation on a third axis transverse to the first and second axes, and a second plurality of generators disposed within the field produced by the generators in the first plurality to produce signals in accordance with the rotary displacements of the generators in the first plurality on the third particular axis.

4. In combination, a first plurality of generators disposed to define a curved envelope along successive generators in the first plurality and disposed relative to one another along the envelope to produce a current sheet having at successive positions along the envelope a density defining a particular function for the production of a continuous field dependent upon the current densities at the successive positions along the envelope, means coupled to the generators in the first plurality for obtaining a rotation of the generators on a first particular axis, a gyro coupled to the generators in the plurality for rotation on a second particular axis transverse to the first particular axis and for rotation with the generators in the first plurality on the first particular axis, means coupled to the gyro for obtaining a rotation of the gyro on the second particular axis, the generators in the plurality being disposed for precessional rotation with the gyro on a third particular axis transverse to the first and second particular axes, and a second plurality of generators disposed to define a curved envelope along successive generators in the second plurality and disposed relative to one another along the envelope in a pattern corresponding to the disposition of the generators in the first plurality along the envelope defined by such generators, the generators in the second plurality being disposed relative to the generators in the first plurality within the field produced by the generators in the first plurality to produce signals in accordance with the precessional rotation of the generators in the first plurality on the third axis.

5. In combination, a first member having an arcuate configuration, a second member having an arcuate configuration corresponding to that of the first member and disposed in enveloping relationship to the first member, a first winding supported by the first member, means including a first winding supported by the second member in magnetically coupled relationship to the first winding on the first member to obtain the production by the first winding on the second member of a magnetic flux linking the first winding on the first member for the induction of a signal in the first winding on the first member, means including a motor electrically coupled to the first winding on the first member to become energized upon the induction of signals in the winding, a gyro wheel disposed within the first member and coupled to the motor to be rotated on a first particular axis by the motor, means coupled to the first member to obtain a rotation of the member on a second particular axis transverse to the first particular axis, and a third winding supported on the second member to produce signals in accordance with the precessional rotation of the first member on a third particular axis transverse to the first and second particular axes.

6. In combination, first and second arcuate members disposed in coaxial relationship to each other, first windings supported by the first and second members in magnetically coupled relationship to each other to obtain an induction of signals in one of the windings upon an introduction of signals to the other winding, means electrically coupled to the first winding supported by the first member to introduce signals to the winding, means including a gyro wheel and a motor disposed within the arcuate members and responsive to the induction of signals in the first winding supported by the second member to obtain a rotation of the gyro wheel on a first particular axis, means for obtaining a rotation of the first member relative to the second member on a second particular axis transverse to the first particular axis, and a second winding supported on a particular one of the first and second members for the induction of signals in accordance with the precessional rotation of the first member relative to the second member on a third particular axis transverse to the first and second particular axes.

7. In combination, a gyro wheel disposed for rotation on a first particular axis, motor means coupled to the gyro wheel for obtaining a rotation of the gyro wheel on the first particular axis, a first winding enveloping the gyro wheel and the motor means and having a plurality of turns disposed relative to one another in an envelope defined by the different turns in the plurality to produce at each position along the envelope a current density trigonometrically related to the current densities at the other positions along the envelope for the production of a particular field related to the current densities, means coupled to the first winding for producing a rotation of the winding on a second particular axis transverse to the first particular axis, means coupled to the first winding for applying signals to the first particular winding to obtain the production of the particular field at the different positions along the envelope, and a second winding enveloping the first winding and having a plurality of turns disposed relative to one another in an envelope defined by the turns in the plurality to detect the precessional movements of the first winding on a third particular axis transverse to the first and second particular axes.

8. In combination, first generating means constructed to produce a field having a particular pattern at different positions around the generating means, means including a source of first signals coupled to the first generating means for introducing the first signals to the first generating means to obtain the production of the field by the first generating means, means coupled to the first generating means to obtain a rotary movement of the first generating means on a first particular axis, a gyro coupled to the first generating means for movement with the first generating means, means coupled to the gyro to obtain a rotary movement of the gyro on a second particular axis transverse to the first particular axis for a precessional rotation of the first generating means and the gyro on a third particular axis transverse to the first and second particular axes, second generating means constructed and disposed relative to the first generating means to produce signals having characteristics representing the rotary movements of the first generating means on the third particular axis, and means coupled to a particular one of the first and second generating means for applying to the particular generating means, second signals having characteristics distinctive from the first signals to obtain the production of a torque on the third particular axis and for providing the second signals at each instant with a value dependent upon the torque to be produced on the third particular axis.

9. In combination, a first plurality of generators each having an external configuration greater than the external configuration of the generators on one side of that generator for a first particular distance along an envelope defined by the generators in the plurality and each having an external configuration less than the external configuration of the generators in the plurality on the opposite side of that generator in the particular direction for the first particular distance along the envelope direction and each having an external configuration less than the external configuration of the generators in the plurality on the first side of that generator for a second particular distance along the envelope and each having an external configuration greater than the external configuration of the generators in the plurality on the opposite side of that generator for the second particular distance along the envelope, a second plurality of generators each having an external configuration greater than the external configuration of the generators in the second plurality on one side of that generator for a first particular distance along a second envelope defined by the generators in the second plurality and each having an external configuration less than the external configurations of the generators in the second plurality on the opposite side of that generator for the particular distance along the second envelope and each having an external configuration less than the external configuration of the generators in the second plurality on the first side of that generator for a second particular distance in the particular direction along the second envelope and each having an external configuration greater than the external configuration of the generators in the second plurality on the opposite side of that generator for the second particular distance along the second envelope, the generators in the first plurality being disposed relative to the generators in the second plurality to produce signals representing rotary movements of the generators in the first plurality relative to the generators in the second plurality on a first particular axis, means for obtaining a rotation of the generators in the first plurality relative to the generators in the second plurality on a second particular axis transverse to the first particular axis, and means including a gyro for obtaining a rotation of the gyro on a third particular axis transverse to the first and second particular axes, the gyro being coupled to the generators in the first plurality for movement with the generators in the first plurality to produce a precessional rotation of the generators in the first plurality relative to the generators in the second plurality on the first axis.

10. In combination, a first plurality of generating means having a first envelope defining an arc along the different generating means in the first plurality and disposed relative to one another along the first envelope to produce a current sheet having at successive positions along the first envelope a density defining a particular trigonometric function for the production of a continuous field dependent upon the current densities at the successive positions in the particular direction, a second plurality of generating means having external configurations corresponding to the external configurations of the generating means in the first plurality, the generating means in the second plurality being disposed in the field produced by the generating means in the first plurality to produce a signal in accordance with the displacement of the generating means in the first plurality relative to the generating means in the second plurality on a first particular axis, means for obtaining a rotation of the generating means in the first plurality relative to the generating means in the second plurality on a second particular axis transverse to the first particular axis, means including a gyro for obtaining a rotation of the gyro on a third particular axis transverse to the first and second particular axes, the gyro being coupled to the generating means in the first plurality for rotation on the first particular axis with the generating means in the first plurality, means coupled to the generating means in the first plurality for introducing to the generating means a first signal having first particular characteristics to obtain the production of the continuous field by the generating means, and means coupled to the generating means in a particular one of the first and second pluralities for applying to the generating means in the particular plurality a second signal having characteristics distinctive from those in the first plurality and having at each instant characteristics in accordance with the relative orientation desired to be produced for the generators in the first and second pluralities in the first particular axis.

11. In combination, a first plurality of generators disposed in spaced relationship to one another to define an arcuate configuration along a first enevelope defined by the different generators in the first plurality, the generators in the first plurality being disposed in a symmetrical relationship along the first envelope and connected in a circuit to produce a continuous field having individual intensities at the different positions along the first envelope in the first plurality, a second plurality of generators disposed in spaced relationship to one another to define an arcuate configuration along a second envelope defined by the generators in the second plurality, the generators in the second plurality being disposed in a symmetrical relationship along the second envelope direction and being disposed in the field produced by the generators in the first plurality, the generators in the second plurality being rotatable relative to the generators in the first plurality on first and second particular axes transverse to one another and the generators in the second plurality being disposed relative to the generators in the first plurality to respond to the field produced by the generators in the first plurality for the production of signals indicating the relative displacement of the generators in the first and second pluralities on the second particular axis, means for obtaining a rotation of the generators in the first plurality relative to the generators in the second plurality on the first particular axis, means including a gyro for obtaining a rotation of the gyro on a third particular axis transverse to the first and second particular axes, the gyro being coupled to the generators in the first plurality for movement with such generators on the first and second particular axes, means electrically coupled in the circuit connecting the generators in the first plurality for introducing a signal to the generators in the first plurality to obtain the production of the continuous field by the generators in the first plurality and to obtain the production of a signal by the generators in the second plurality in accordance with the rotary movements of the generators in the first plurality relative to the generators in the second plurality on the second particular axis.

12. The combination set forth in claim 11 in which the signal means introduces to the generating means in the first plurality first signals having first particular characteristics, and in which second signal means are connected to the generating means in the first and second pluralities to introduce to such generating means second signals having second particular characteristics distinctive from the first particular characteristics to control the relative orientation of the generators in the first plurality relative to the generators in the second plurality on the first particular axis.

13. In combination, a first winding having a plurality of turns disposed in a spherical configuration along a first particular axis, a second winding having a plurality of turns disposed in a spherical configuration along a second particular axis perpendicular to the first particular axis, the second winding being disposed in concentric relationship with the first winding, means coupled to the first and second windings for introducing signals to the windings to obtain the production by the windings of magnetic fields having a trigonometric pattern along an envelope defining the successive turns in the windings, means including a gyro for obtaining a rotation of the gyro on the second particular axis, means coupled to the first and second windings for obtaining a rotation of the first and second windings on the first particular axis at first particular times, means coupled to the first and second windings for obtaining a rotation of the first and second windings on a third particular axis at second particular times where the third particular axis is perpendicular to the first and second particular axes, the gyro being coupled to the first and second windings for rotation with the first and second particular windings on the first and third particular axes, a third winding having a plurality of turns disposed in a spherical configuration along the first particular axis to measure the precessional movements of the first winding on the third particular axis, and a fourth winding having a plurality of turns disposed in a spherical configuration along the second particular axis to measure the precessional movements of the second winding on the first particular axis, the third and fourth windings being disposed in concentric relationship with the first and second windings and being disposed in coupled relationship to the particular field produced by the first and second windings.

14. The combination set forth in claim 13 in which the first and second windings are disposed on a first spherical member made from a material having a high magnetic permeability and in which the third and fourth windings are supported within a second spherical member made from a material having a high magnetic permeability and in which a first pair of torsion wires are disposed between the first and second spherical members at diametrically opposite ends of the first and second spherical members on the first particular axis to support the first spherical member for rotation relative to the second spherical member on the first particular axis and in which a second pair of torsion wires are disposed between the first and second spherical members at diametrically opposite ends of the first and second spherical members on the second particular axis to support the first spherical member for rotation relative to the second spherical member on the second particular axis.

15. In combination, a first spherical member made from a material having a high magnetic permeability, a second spherical member made from a material having a high magnetic permeability, the second spherical member being disposed in concentric relationship to the first spherical member, a first winding supported by the first spherical member and provided with a plurality of turns equally spaced along a first particular axis, a second winding supported by the second spherical member and provided with a plurality of turns equally spaced along a second particular axis perpendicular to the first particular axis, a gyro rotor disposed within the first and second spherical members and supported by the first spherical member for movement with the first member on the first particular axis and on a third particular axis perpendicular to the first and second particular axes and for rotation relative to the first member on the second particular axis, and means for obtaining a rotation of the gyro rotor on the first particular axis to obtain a precession of the gyro on the third particular axis and to obtain the production of an output signal by the second winding in accordance with the precession of the first winding on the third particular axis.

16. The combination set forth in claim 15 in which a fluid is disposed in space between the first and second spherical members.

17. The combination set forth in claim 15 in which shafts extend between the first and second spherical members at diametrically opposite ends of the spherical members on the third particular axis to support the first spherical member for precessional rotation relative to the second spherical member on this axis.

18. The combination set forth in claim 15 in which torsion wires extend between the first and second spherical members at diametrically opposite ends of the spherical members on the third particular axis to support the first spherical member for precessional rotation relative to the second spherical member on this axis.

19. The combination set forth in claim 15 in which a fluid is disposed in the space between the first and second spherical members to support the first spherical members in concentric relationship with the second spherical members and in which umbilical cords are inserted through the second spherical member to obtain an energizing of the first winding and the gyro rotor means.

20. In combination, a first spherical member made from a material having a high magnetic permeability, a second spherical member made from a material having a high magnetic permeability, the second spherical member being disposed in concentric and enveloping relationship to the first spherical member and being separated from the first spherical member by a small radial distance, a first winding disposed within the second spherical member and provided with a plurality of turns equally spaced along a first particular axis, means coupled electrically to the first winding to introduce an alternating signal to the winding, a second winding disposed on the first spherical member and provided with a plurality of turns equally spaced along the first particular axis for the induction of signals in the second winding upon the introduction of signals to the first winding, the first spherical member being disposed for rotation on the first particular axis perpendicular to the first particular axis, a gyro rotor supported by the first spherical member at a position within the member for rotation on a second particular axis relative to the first spherical member and for movement on the first particular axis with the member and for precessional movement with the first spherical member on a third particular axis where the first, second and third particular axes are mutually perpendicular, means disposed within the first spherical member and responsive to the signals induced in the second winding for obtaining a rotation of the rotor on the second particular axis, and a third winding disposed on the second spherical member and provided with a plurality of turns equally spaced along the second particular axis for the induction in the third winding of a signal in accordance with the precessional rotation of the first spherical member on the third particular axis.

21. In combination, a first spherical member made from a material having a high magnetic permeability, a second spherical member made from a material having a high magnetic permeability, the second spherical member being disposed in concentric relationship to the first spherical member, the first spherical member being weighted at a first end of the member to provide for a precession of the first spherical member on a first particular axis relative to the second spherical member upon a linear acceleration of the first spherical member in a direction perpendicular to the disposition of the weight in the first spherical member, a first winding disposed on the first spherical member and provided with a first plurality of turns disposed along a second particular axis corresponding to the direction of linear acceleration of the first particular member to produce a magnetic field having a trigonometric pattern at successive positions along an envelope intersecting the successive turns in the first plurality, a second winding disposed within the second spherical member and provided with a second plurality of turns disposed along a third particular axis to produce a magnetic field having a trigonometric pattern at successive positions along an envelope intersecting the successive turns in the second plurality, the first and second windings being disposed relative to each other and to the weight in the first spherical member to provide a perpendicular relationship for the first, second and third particular axes, and means for applying a signal to the first particular winding to obtain the production of the magnetic field and to obtain the induction in the second particular winding of a signal having characteristics related to the trigonometric pattern of the magnetic field and related to the precession of the first spherical member on the first particular axis.

22. The combination set forth in claim 21 in which gyro means are disposed along the third particular axis for rotation on that axis.

23. In combination, a first member, a first plurality of generators supported by the first member and disposed relative to one another to produce a continuous field along an envelope intersecting the successive generators in the first plurality, a second member, a second plurality of generators supported by the second member and disposed relative to one another to produce the continuous field along an envelope intersecting the successive generators in the second plurality, the first member and the second member being disposed relative to one another to obtain a coupling between the fields produced by the generators in the first and second pluralities and to obtain the production of signals by the generators in the second plurality in accordance with the production of the continuous field by the generators in the first plurality and in accordance with the relative disposition of the generators in the first and second pluralities on a precession axis, the first member being weighted at one end, and means coupled to the generators in the first plurality for obtaining the production of the continuous field by such generators, the generators in the first and second pluralities and the weighted end of the first member being disposed relative to one another to obtain a precession of the first member and the generators in the first plurality on the precession axis upon an acceleration of the member in a direction transverse to the precession axis.

24. The combination set forth in claim 23 in which gyro rotor means are supported by the first member to provide a rotation on an axis transverse to the precession axis and the direction of acceleration of the first member.

25. In combination for use with a control member having a variable angular position, a first plurality of generators disposed in a spherical configuration along a first particular axis and with a particular spacing of turns along the first particular axis to produce a trigonometric field along an envelope intersecting the different generators in the plurality, a second plurality of generators disposed in concentric relationship to the generators in the first plurality and disposed along a second particular axis perpendicular to the first particular axis and disposed with a particular spacing of turns along the second particular axis to produce a trigonometric field along an envelope intersecting the different generators in the second plurality, the generators in the first and second pluralities being disposed relative to the control member for rotation relative to the control member on the second particular axis, gyro means disposed within the generators in the first plurality for producing a rotary motion of the gyro means on the first particular axis, means coupled to the generators in the first plurality for obtaining the production of the continuous field in the generators in the first plurality, and means responsive to the signals produced in the generators in the second plurality upon a precessional movement of the generators in the first plurality on a third particular axis perpendicular to the first and second particular axes to obtain a rotation of the generators in the first plurality on the second particular axis in a direction and through an angle for maintaining the generators in the first plurality in a particular angular disposition in space.

26. In combination for use with a control member having a variable angular position, a first plurality of generators disposed relative to one another to produce a continuous field having a particular intensity at successive positions along an envelope intersecting the different generators in the plurality, a second plurality of generators disposed within the field produced by the generators in the first plurality and disposed relative to the generators in the first plurality to sense movements of the generators in the first plurality on a first particular axis and disposed relative to one another to produce a continuous field having the particular intensity at successive positions along an envelope intersecting the different generators in the second plurality, gyro means coupled to the generators in the first plurality to produce a rotation of the gyro means on a second particular axis transverse to the first particular axis and a precession of the generators on the first particular axis upon a rotation of the generators on a third particular axis transverse to the first and second particular axes, the generators in the first and second pluralities being disposed relative to the control member to obtain a rotation of the generators in the first and second pluralities on the third particular axis relative to the control member, means coupled to the generators in the first plurality for introducing signals to the generators in the first plurality for the production of signals in the generators in the second plurality in accordance with the precessional movements of the generators in the first plurality on the first particular axis and in accordance with the continuous field produced by the generators in the first plurality, and means responsive to the signals produced by the generators in the second plurality for obtaining a rotation of the generators in the first and second pluralities on the third particular axis in a direction and through an angle to maintain the generators in the second plurality in a particular disposition in space on the third particular axis.

27. In combination for use with a control member having a variable angular position, a first winding having a pluarlity of turns spaced relative to one another to produce a current sheet having a particular pattern of intensities at successive positions along an envelope defining the successive turns in the plurality, a second winding having a plurality of turns spaced relative to one another to produce a current sheet having the particular pattern of intensities at successive positions along an envelope defining the successive turns in the plurality, the second winding being disposed in magnetically coupled relationship to the first winding to produce signals in accordance with the relative dispositions of the windings on a first particular axis and in accordance with the current sheet produced in the first winding, gyro means coupled to the first and second windings to produce a rotation of the gyro means on a second axis transverse to the first axis and to obtain precessional movements of the first winding on the first particular axis in accordance with movements of the first winding on a third axis transverse to the first and second axes, means coupled to the first winding to produce in the winding the current sheet having the particular pattern of intensities, and means responsive to the signals induced in the second winding to obtain a rotation of the first winding on the third axis in a direction opposite to the movements of the winding on the third axis for a return of the winding to a particular disposition on the third axis.

28. In combination for use with a control member having a variable angular position, a first winding having a plurality of turns which are disposed in a first spherical configuration and which are provided with equal spacing between successive pairs of turns in the plurality upon a projection of the turns upon a first particular axis defining the centers of the turns, a second winding having a plurality of turns which are disposed in a second spherical configuration and which are provided with an equal spacing between successive pairs of turns in the plurality upon a projection of the turns in the second plurality upon a second particular axis defining the centers of the turns, the second winding being disposed in concentric relationship to the first winding and being disposed with the second particular axis perpendicular to the first particular axis, the first and second windings being rotatable on the second particular axis relative to the control member, means coupled to the first winding to introduce a signal to the first winding for the production by the winding of a magnetic field coupling the second winding, gyro rotor means coupled to the first winding to obtain a rotation of the gyro rotor means on the first particular axis for a precessional movement of the first winding on a third particular axis perpendicular to the first and second particular axes and for the induction of a signal in the second winding in accordance with such precessional movements of the first winding and in accordance with the magnetic field produced by the first winding, and means responsive to the signal induced in the second winding for producing a rotation of the first winding on the second particular axis in a direction and through an angle to maintain the winding in a particular angular disposition in space on the second particular axis.

29. The combination set forth in claim 28 in which the first and second windings are respectively supported by first and second spherical members having a high magnetic permeability and in which the first winding is disposed on the first spherical member and in which the second winding is disposed within the second spherical member.

30. In combination for use with a control member having a variable angular position, first and second pluralities of generators, each of the first and second pluralities of generators being disposed in perpendicular relationship to the other one of the first and second pluralities of generators, the generators in each of the first and second pluralities being disposed to produce a continuous field having a trigonometric pattern along an envelope intersecting the different generators in the plurality, third and fourth pluralities of generators, each of the third and fourth pluralities of generators being disposed in perpendicular relationship to the other one of the third and fourth pluralities of generators, the generators in each of the third and fourth pluralities being respectively disposed within the fields produced by the first and second pluralities of generators and being disposed to produce a continuous field having a trigonometric pattern along an envelope intersecting the different generators in the plurality, the generators in the third and fourth pluralities being coupled to the control member for angular displacement with the control member, gyro means coupled to the generators in the third and fourth pluralities to obtain a rotation of the generators on a particular axis, means coupled to the generators in the first and second pluralities for introducing signals to such generators to obtain the production of the continuous fields by the generators and to obtain the production of first signals in the generators in the third and fourth pluralities in accordance with the angular displacements between the generators in the first and second pluralities and the generators in the third and fourth pluralities and in accordance with the continuous field produced by the generators in the first and second pluralities, and means responsive to the signals produced in the generators in the third and fourth pluralities for producing second signals having characteristics different from the first signals and for introducing such signals to the generators in the third and fourth pluralities to maintain the generators in the first and second pluralities in a particular angular position in space.

31. The combination set forth in claim 30 in which the generators in the first and second pluralities are disposed in a first spherical configuration and in which the generators in the third and fourth pluralities are disposed in a second spherical configuration concentric with the first spherical configuration and in which the gyro means are disposed within the first and second spherical configurations.

32. In combination for use with a control member having a variable angular position, a first member, first and second pluralities of generators supported by the first member, each of the first and second pluralities of generators being disposed in a particular transverse relationship to the other one of the first and second pluralities of generators, the generators in each of the first and second pluralities being disposed relative to one another to produce a continuous field along an envelope defining the different generators in the plurality, a second member, third and fourth pluralities of generators supported by the second member, each of the third and fourth pluralities of generators being disposed in the particular transverse relationship to the other one of the third and fourth pluralities of generators, the generators in each of the third and fourth pluralities being respectively disposed within the fields produced by the generators in the first and second pluralities and being disposed relative to one another in a pattern respectively corresponding to the disposition of the generators in the first and second pluralities, means coupled to the generators in the first and second pluralities for obtaining the production of the continuous fields by these generators, the generators in the third and fourth pluralities being coupled to the control member for angular displacements in accordance with the angular displacements of the control member, gyro means coupled to the generators in the first and second pluralities to obtain a rotary movement of the gyro means on a particular axis transverse to the disposition of the generators and to obtain a precessional movement of these generators and the production of signals in the generators in the third and fourth pluralities in accordance with such precessional movements, and means responsive to the signals produced in the generators in the third and fourth pluralities for introducing signals to the generators in the third and fourth pluralities to maintain the generators in the first and second pluralities in a particular angular disposition in space.

33. In combination for use with a control member having a variable angular position, a first member, first and second windings each disposed on the first member in a transverse relationship to the other of the first and second windings and each provided with a plurality of turns spaced relative to one another to produce a current sheet having a particular pattern of intensities at successive positions along an envelope intersecting the successive turns in the plurality, a second member, third and fourth windings each disposed on the second member in a transverse relationship to the other one of the third and fourth windings and each provided with a plurality of turns spaced relative to one another to produce a current sheet having the particular pattern of intensities at successive positions along an envelope intersecting the successive turns in the plurality, the third and fourth windings being respectively disposed relative to the first and second windings for the production of signals in the third and fourth windings in accordance with the current sheets in the first and second windings and in accordance with the angular displacement of the first and second windings relative to the third and fourth windings, means coupled to the first and second windings for introducing signals to these windings to obtain the production of the current sheets in the windings, gyro means coupled to the first and second windings to provide a rotation of the gyro means and a precession of the windings in accordance with the angular rotation of the windings, the third and fourth windings being angularly coupled to the control member for angular displacement in accordance with the angular displacement of the control member and for the induction of first signals in the third and fourth windings in accordance with such rotation and in accordance with the signals introduced to the first and second windings, and means responsive to the first signals induced in the third and fourth windings for producing second signals related to the first signals and having characteristics different from the first signals and for introducing the second signals to the third and fourth windings to maintain the first and second windings in a particular angular disposition in space.

34. In combination for use with a control member having a variable angular position, first and second windings each disposed in a perpendicular relationship to the other one of the first and second windings and each including a plurality of turns disposed relative to one another in an envelope itnersecting the different turns in the winding to obtain the production of a field having a trigonometric pattern along the envelope, third and fourth windings each disposed in a perpendicular relationship to the other one of the third and fourth windings and each including a plurality of turns disposed relative to one another in an envelope intersecting the different turns in the winding to obtain the production of a field having a trigonometric pattern along the envelope, the first and second windings being disposed relative to the third and fourth windings to obtain a coupling between the field produced by the first and second windings and the field produced by the third and fourth windings, the first and second windings being coupled to the control member for angular movement in a accordance with the angular movement of the control member, gyro rotor means coupled to the third and fourth windings to obtain a rotation of the gyro rotor means and a precession of the third and fourth windings in accordance with the angular movements of the first and second windings, means coupled to the third and fourth windings to introduce signals to the third and fourth windings for the production by each of the windings of a field having the trigonometric pattern along the winding and for the induction of first signals in the first and second windings in accordance with the precessional movements of the third and fourth windings, and means responsive to the first signals for producing second signals having characteristics related to the first signals but different from the first signals and for introducing such second signals to the first and second windings to maintain the third and fourth windings in a particular angular disposition in space.

35. In combination for use with a control member having a variable angular position, a first spherical member made from a material having a high magnetic permeability, a second spherical member made from a material having a high magnetic permeability, the second spherical member being disposed in spaced and concentric relationship to the first spherical member, first and second windings supported by the first spherical member and disposed in perpendicular relationship to each other, each of the first and second windings being provided with a plurality of turns equally spaced along an axis defining the centers of the turns, third and fourth windings supported by the second spherical member and disposed in perpendicular relationship to each other, each of the third and fourth windings being provided with a plurality of turns equally spaced along an axis defining the centers of the turns, the first and fourth windings being disposed along a first particular axis and the second and third windings being disposed along a second particular axis where the second particular axis is perpendicular to the first particular axis, gyro means disposed within the first and second spherical members and coupled to the first spherical member to rotate on the first particular axis and to produce precessional movements of the first spherical member in accordance with the rotary movements of the member on the second particular axis and on a third particular axis perpendicular to the first and second particular axes, the control member being coupled to the second spherical member to vary the angular positioning of the second spherical member in accordance with the variable angular position of the control member, means coupled to the first and second windings for introducing input signals to the windings to obtain the induction of first signals in the third and fourth windings in accordance with the input signals and in accordance with the precessional movements of the first spherical member on the second and third particular axes, and means responsive to the first signals for producing second signals distinctive from the first signals and for introducing the second signals to the third and fourth windings to maintain the first spherical member in a particular angular disposition in space on the second and third particular axes.

References Cited in the file of this patent

UNITED STATES PATENTS

| | | |
|---|---|---|
| 1,589,039 | Anschutz-Kaempfe | June 15, 1926 |
| 2,740,299 | Jewell | Apr. 3, 1956 |
| 2,785,573 | Bentley | Mar. 19, 1957 |
| 2,878,445 | Scarborough | Mar. 17, 1959 |
| 2,903,891 | Sedgfield | Sept. 15, 1959 |